(12) United States Patent
Sergeev et al.

(10) Patent No.: US 11,297,691 B2
(45) Date of Patent: Apr. 5, 2022

(54) INTERFERENCE COORDINATION FOR NETWORKS SERVING AERIAL VEHICLES

(71) Applicant: Apple Inc., Cupertino, CA (US)

(72) Inventors: Victor Sergeev, Nizhny Novgorod (RU); Seunghee Han, San Jose, CA (US); Feng Xue, Redwood City, CA (US); Alexei Davydov, Nizhny Novgorod (RU); Gregory Morozov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 245 days.

(21) Appl. No.: 16/603,171

(22) PCT Filed: May 1, 2018

(86) PCT No.: PCT/US2018/030440
§ 371 (c)(1),
(2) Date: Oct. 4, 2019

(87) PCT Pub. No.: WO2018/204353
PCT Pub. Date: Nov. 8, 2018

(65) Prior Publication Data
US 2020/0037397 A1    Jan. 30, 2020

Related U.S. Application Data

(60) Provisional application No. 62/501,603, filed on May 4, 2017.

(51) Int. Cl.
*H04W 88/10* (2009.01)
*H04W 76/11* (2018.01)
(Continued)

(52) U.S. Cl.
CPC ............ *H04W 88/10* (2013.01); *B64C 39/024* (2013.01); *H04W 36/20* (2013.01); *H04W 76/11* (2018.02); *H04W 76/27* (2018.02); *H04W 92/20* (2013.01)

(58) Field of Classification Search
CPC ..... H04W 92/20; H04W 36/20; H04W 76/27; H04W 76/11; H04W 88/10; H04W 72/04; H04W 88/08; H04W 76/00; B64C 39/024
See application file for complete search history.

(56) References Cited

U.S. PATENT DOCUMENTS 8,918,099 B2 * 12/2014 Mitchell ............. H04B 7/2043
455/431
9,537,561 B1    1/2017 Kotecha et al.
(Continued)

FOREIGN PATENT DOCUMENTS

WO    WO-2015171055 A1    11/2015
WO    WO-2016182738 A1    11/2016

OTHER PUBLICATIONS

Huawei et al., "Potential Enhancements for Drones", 3GPP Draft, R1-1704287, vol. RAN WG1, Apr. 2, 2017, Spokane, USA, 3 pgs.
(Continued)

*Primary Examiner* — Hassan A Phillips
*Assistant Examiner* — Prenell P Jones
(74) *Attorney, Agent, or Firm* — Kowert, Hood, Munyon, Rankin & Goetzel, P.C.

(57) ABSTRACT

Embodiments of interference coordination for aerial vehicle user equipment (UE) are described. In some embodiments, a base station (BS) is configured to select a subset of time-frequency resources dedicated for use in serving aerial vehicle UEs and communicate with the aerial vehicle UEs via the subset of time-frequency resources. In some embodiments, the BS may transmit signaling to a neighbor BS that indicates the BS has dedicated the subset of time-frequency
(Continued)

resources for serving aerial vehicle UEs and the subset of time-frequency resources to be used. The BS may receive an indication from the neighbor BS that a neighbor BS is to dedicate the subset of time-frequency resources to serve aerial vehicle UE, and based on the indication, the BS may reduce transmission activities in the subset of time-frequency resources, including refraining from transmitting or reducing an amount of information or power level of signaling to the aerial vehicle UEs.

25 Claims, 10 Drawing Sheets

(51) Int. Cl.
*H04W 76/27* (2018.01)
*B64C 39/02* (2006.01)
*H04W 36/20* (2009.01)
*H04W 92/20* (2009.01)

(56) References Cited

U.S. PATENT DOCUMENTS

| | | | |
|---|---|---|---|
| 9,661,658 B2* | 5/2017 | Li | H04W 28/08 |
| 10,805,822 B2* | 10/2020 | Kim | H04W 36/0088 |
| 2005/0136934 A1* | 6/2005 | Alard | H04W 72/042 |
| | | | 455/450 |
| 2005/0149296 A1* | 7/2005 | Sieracki | G06K 9/00523 |
| | | | 702/189 |
| 2008/0167580 A1* | 7/2008 | Avni | A43D 1/00 |
| | | | 600/587 |
| 2012/0076106 A1* | 3/2012 | Bhattad | H04L 5/0062 |
| | | | 370/330 |
| 2013/0272262 A1* | 10/2013 | Li | H04L 5/0023 |
| | | | 370/330 |
| 2014/0024365 A1* | 1/2014 | Mitchell | H04B 7/212 |
| | | | 455/431 |
| 2014/0098793 A1 | 4/2014 | Hunukumbure et al. | |
| 2014/0105121 A1* | 4/2014 | Jose | H04L 5/0073 |
| | | | 370/329 |
| 2014/0119334 A1* | 5/2014 | Kazmi | H04W 24/10 |
| | | | 370/330 |
| 2014/0242963 A1* | 8/2014 | Novlan | H04W 48/16 |
| | | | 455/418 |
| 2015/0049649 A1* | 2/2015 | Zhu | H04W 74/004 |
| | | | 370/277 |
| 2015/0109932 A1* | 4/2015 | Goldhamer | H04L 47/125 |
| | | | 370/236 |
| 2015/0208410 A1* | 7/2015 | Koutsimanis | H04W 72/0426 |
| | | | 370/252 |
| 2016/0142944 A1 | 5/2016 | Cao | |
| 2016/0218841 A1 | 7/2016 | Centonza et al. | |
| 2016/0338118 A1 | 11/2016 | Vajapeyam et al. | |
| 2016/0353440 A1* | 12/2016 | Lee | H04W 72/0453 |
| 2017/0048051 A1* | 2/2017 | Siomina | H04L 1/1825 |
| 2017/0181146 A1* | 6/2017 | Franceschini | H04W 72/044 |
| 2018/0049196 A1* | 2/2018 | Gupta | H04L 5/0048 |
| 2018/0082308 A1* | 3/2018 | Gong | B64C 39/024 |
| 2018/0091908 A1* | 3/2018 | Goel | G08G 5/0069 |
| 2018/0203385 A1* | 7/2018 | Konishi | G03G 15/2053 |
| 2018/0288630 A1* | 10/2018 | Guirguis | H04W 24/10 |
| 2019/0300172 A1* | 10/2019 | Di Benedetto | H04N 5/772 |
| 2020/0028543 A1* | 1/2020 | Ng | H04L 1/0077 |
| 2020/0053661 A1* | 2/2020 | Yang | H04W 52/383 |
| 2020/0100187 A1* | 3/2020 | Balasubramanian | B64C 39/024 |

OTHER PUBLICATIONS

Ericsson, "On Potential Enhancements for Low Altitude Aerial Vehicles", 3GPP Draft; R1-1705254, vol. RAN WG1, Mar. 25, 2017, Spokane, USA, 3 pgs.
European Search Report for Application No. EP18794724.7, dated Dec. 4, 2020, 11 pgs.
"International Application Serial No. PCT/US2018/030440, International Search Report dated Aug. 31, 2018", 3 pgs.
"International Application Serial No. PCT/US2018/030440, Written Opinion dated Aug. 31, 2018", 8 pgs.

* cited by examiner

INTERFERENCE COORDINATION FOR NETWORKS SERVING AERIAL VEHICLES

PRIORITY CLAIM

This application is a U.S. National Stage Filing under 35 U.S.C. 371 from International Application No. PCT/US2018/030440, filed May 1, 2018 and published in English as WO 2018/204353 on Nov. 8, 2018, which claims priority to U.S. Provisional Patent Application Ser. No. 62/501,603 filed, May 4, 2017, each of which in incorporated herein by reference in its entirety.

TECHNICAL FIELD

Embodiments pertain to wireless networks and wireless communications. Some embodiments relate to 3GPP Long Term Evolution (LTE) networks including LTE-Advanced (LTE-A) networks. Some embodiments relate to 5G networks. Some embodiments relate to networks serving aerial vehicles. Some embodiments relate to methods, computer readable media, and apparatuses for interference coordination for aerial vehicles.

BACKGROUND

One of the major problems that arises for wireless networks (e.g., LTE networks, 5G networks) serving user equipment (UE) that are aerial vehicles is significant interference in uplink and downlink communications, such as communications between aerial vehicles and base stations (BSs) (e.g., evolved NodeBs (eNBs), macro eNBs, next Generation NodeBs (gNB)).

Aerial vehicles may experience considerable levels of interference when a large enough group of base stations are deployed within a region of the aerial vehicle, partly because of the inherent properties of radio frequency (RF) wave propagation in free space (e.g., line-of-sight radio link between an aerial vehicle and a base station).

In such situations, low signal-to-interference noise ratio (SINR) values may result in a significant amount of aerial vehicles serviced by the base stations. Existing interference coordination techniques, such as inter-cell interference coordination (ICIC) have been used to address this problem, however, a solution is desirable to specifically address interference in wireless communications to and from aerial vehicles.

DESCRIPTION OF EMBODIMENTS

Figure 1:
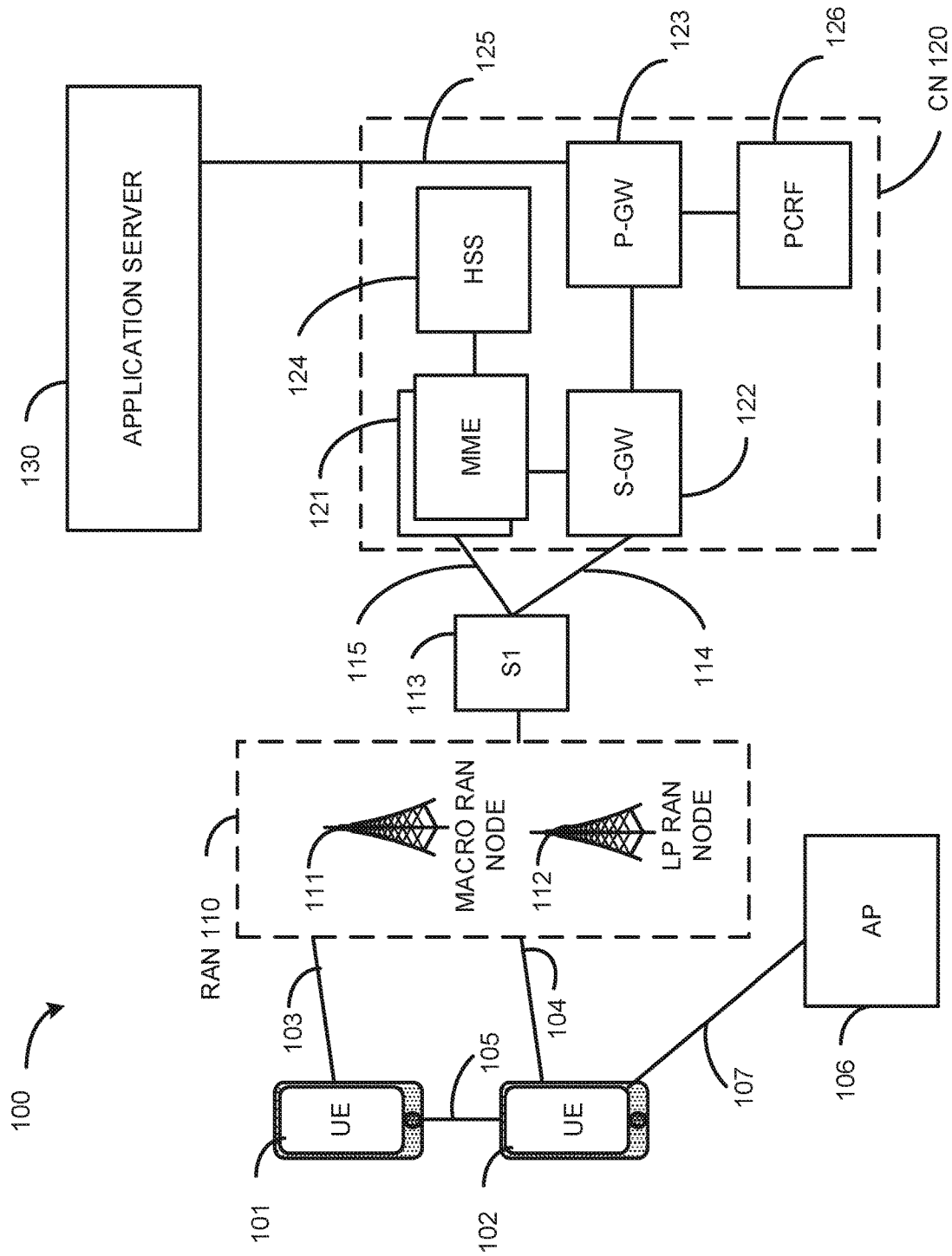
FIG. 1 illustrates an exemplary system architecture of a wireless network in accordance with some embodiments.

FIG. 1 illustrates an architecture of a system 100 of a network in accordance with some embodiments. In some embodiments, the system 100 may be configured for serving aerial vehicles wherein base stations may communicate with aerial vehicle user equipment (UE) and use interference coordination operations in serving the aerial vehicle UE.

The system 100 is shown to include a UE 101 and a UE 102, which may be a non-aerial (e.g., terrestrial) UE or an aerial vehicle UE. The LEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived LE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The LEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104, for example, for connections to the UE (e.g., aerial vehicle UE), for example, for an interference coordination operation. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) IAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UM ITS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2A:
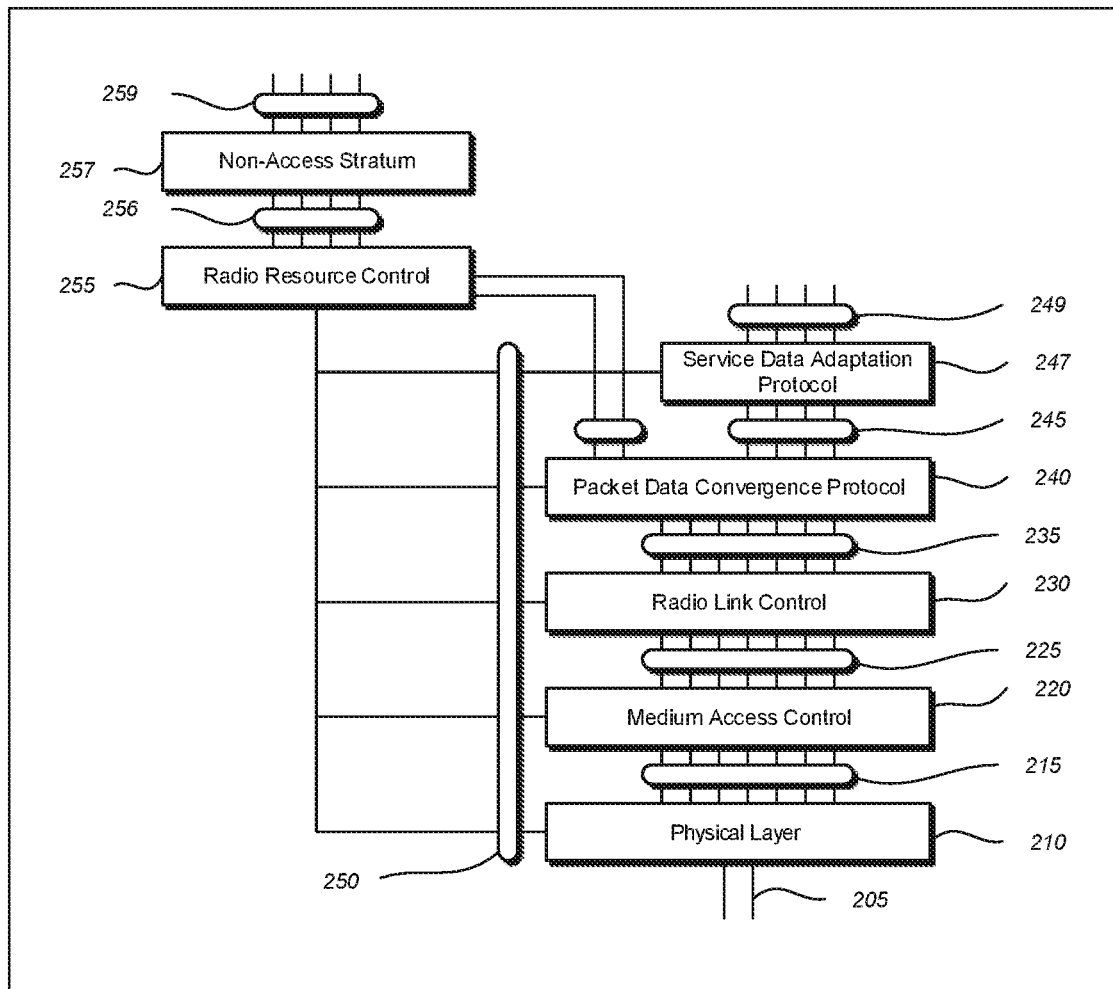
FIG. 2A illustrates protocol functions that may be implemented in a wireless communication device in accordance with some embodiments.

FIG. 2A illustrates protocol functions that may be implemented in a wireless communication device in accordance with some embodiments, for example, in a UE (e.g., aerial vehicle UE) or a base station (BS) that may be configured for interference coordination operations for aerial vehicles. In some embodiments, protocol layers may include one or more of physical layer (PHY) 210, medium access control layer (MAC) 220, radio link control layer (RLC) 230, packet data convergence protocol layer (PDCP) 240, service data adaptation protocol (SDAP) layer 247, radio resource control layer (RRC) 255, and non-access stratum (NAS) layer 257, in addition to other higher layer functions not illustrated.

According to some embodiments, protocol layers may include one or more service access points that may provide communication between two or more protocol layers.

According to some embodiments, PHY 210 may transmit and receive physical layer signals 205 that may be received or transmitted respectively by one or more other communication devices (e.g., UE 101, UE 102, iUE 708, device 300). According to some aspects, physical layer signals 205 may comprise one or more physical channels.

According to some embodiments, an instance of PHY 210 may process requests from and provide indications to an instance of MAC 220 via one or more physical layer service access points (PHY-SAP) 215. According to some embodiments, requests and indications communicated via PHY-SAP 215 may comprise one or more transport channels.

According to some embodiments, an instance of MAC 210 may process requests from and provide indications to an instance of RLC 230 via one or more medium access control service access points (MAC-SAP) 225. According to some embodiments, requests and indications communicated via MAC-SAP 225 may comprise one or more logical channels.

According to some embodiments, an instance of RLC 230 may process requests from and provide indications to an instance of PDCP 240 via one or more radio link control service access points (RLC-SAP) 235. According to some embodiments, requests and indications communicated via RLC-SAP 235 may comprise one or more RLC channels.

According to some embodiments, an instance of PDCP 240 may process requests from and provide indications to one or more of an instance of RRC 255 and one or more instances of SDAP 247 via one or more packet data convergence protocol service access points (PDCP-SAP) 245. According to some embodiments, requests and indications communicated via PDCP-SAP 245 may comprise one or more radio bearers.

According to some embodiments, an instance of SDAP 247 may process requests from and provide indications to one or more higher layer protocol entities via one or more service data adaptation protocol service access points (SDAP-SAP) 249. According to some embodiments, requests and indications communicated via SDAP-SAP 249 may comprise one or more quality of service (QoS) flows.

According to some embodiments, RRC entity 255 may configure, via one or more management service access points (M-SAP), embodiments of one or more protocol layers, which may include one or more instances of PHY 210, MAC 220, RLC 230, PDCP 240 and SDAP 247. According to some embodiments, an instance of RRC may process requests from and provide indications to one or more NAS entities via one or more RRC service access points (RRC-SAP).

Figure 2B:
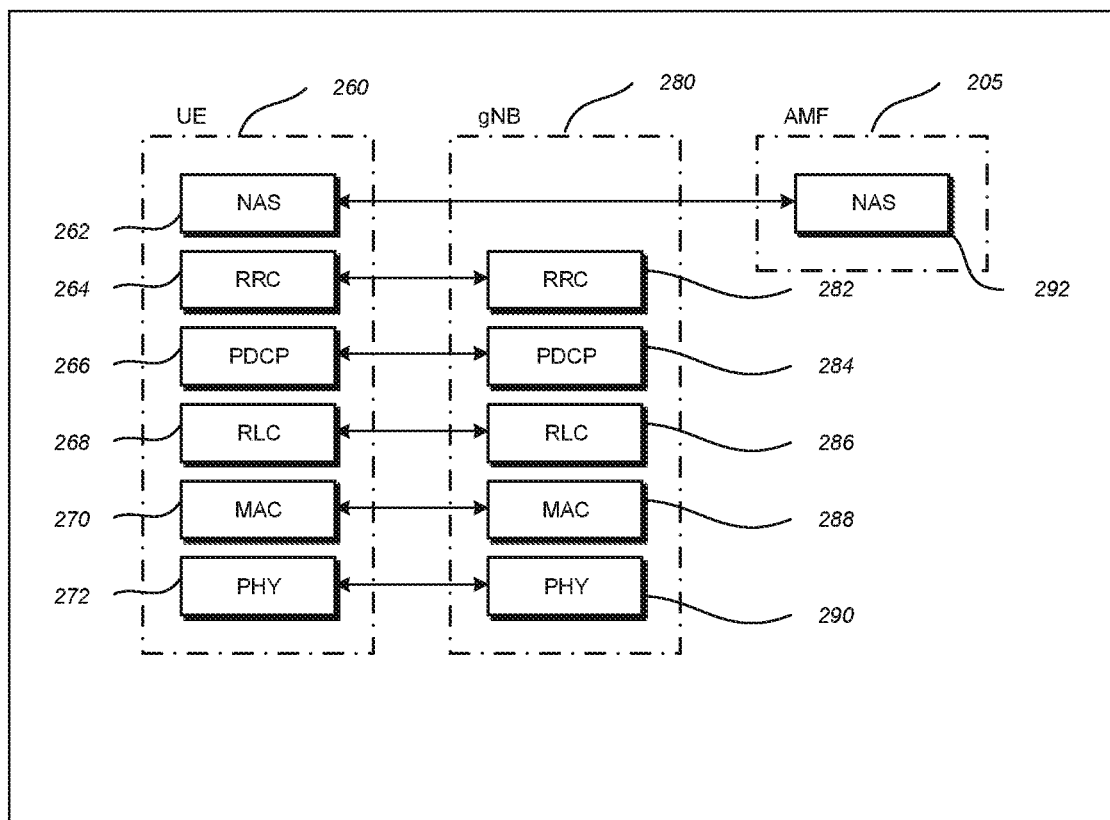
FIG. 2B illustrates protocol entities that may be implemented in wireless communication devices in accordance with some embodiments.

FIG. 2B illustrates protocol entities that may be implemented in wireless communication devices in accordance with some embodiments. For example, protocol entities that may be implemented in wireless communication devices, configured for interference coordination operations for aerial vehicle UE, including one or more of a UE 260 (e.g., UE 101, UE 102, UE 708, device 300), a base station, which may be termed an evolved node B (eNB), or new radio node B (gNB) 280, and a network function, which may be termed a mobility management entity (MME), or an access and mobility management function (AMF) 294, according to some embodiments.

According to some embodiments, 5GNB 280 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some embodiments, one or more protocol entities that may be implemented in one or more of UE 260 (e.g., UE 101, UE 102, UE 708, device 300), gNB 280 and AMF 294, may be described as implementing all or part of a protocol stack in which the layers are considered to be ordered from lowest to highest in the order PHY, MAC, RLC, PDCP, RRC and NAS. According to some embodiments, one or more protocol entities that may be implemented in one or more of UE 260, gNB 280 and AMF 294, may communicate with a respective peer protocol entity that may be implemented on another device, using the services of respective lower layer protocol entities to perform such communication.

According to some embodiments, UE PHY 272 and peer entity gNB PHY 290 may communicate using signals transmitted and received via a wireless medium. According to some embodiments, UE MAC 270 and peer entity gNB MAC 288 may communicate using the services provided respectively by UE PHY 272 and gNB PIHY 290. According to some embodiments, UE RLC 268 and peer entity gNB RLC 286 may communicate using the services provided respectively by UE MAC 270 and gNB MAC 288. According to some embodiments, UE PDCP 266 and peer entity gNB PDCP 284 may communicate using the services provided respectively by UE RLC 268 and 5GNB RLC 286. According to some embodiments, UE RRC 264 and gNB RRC 282 may communicate using the services provided respectively by UE PDCP 266 and gNB PDCP 284. According to some embodiments, UE NAS 262 and AMF NAS 292 may communicate using the services provided respectively by UTE RRC 264 and gNB RRC 282.

Figure 3:
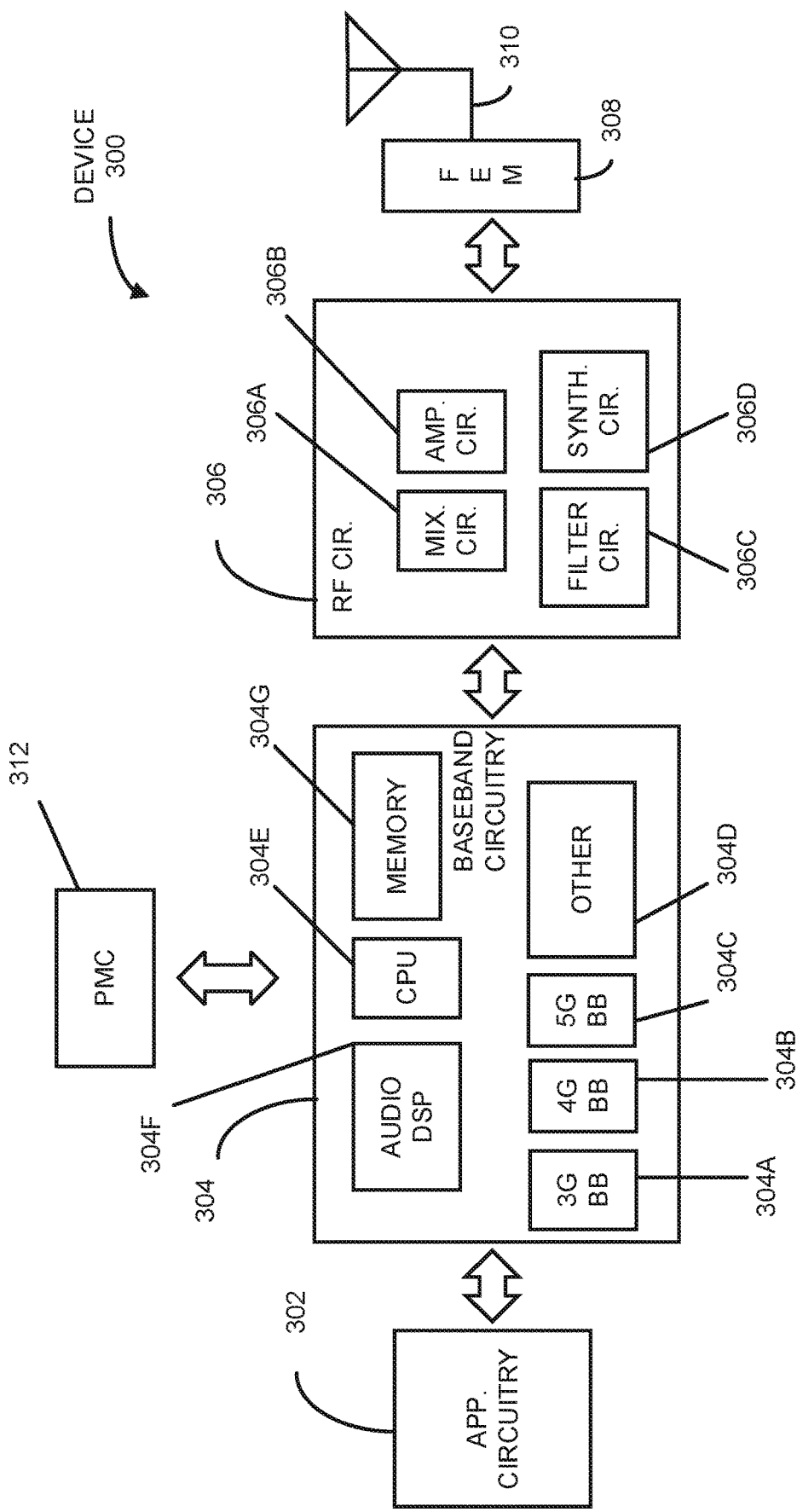
FIG. 3 illustrates example components of a device in accordance with some embodiments.

FIG. 3 illustrates example components of a device 300 in accordance with some embodiments. For example, the device 300 (e.g., UE 101, UE 102, UE 260, UE 708, RAN Node 111/112) may be a device configured for interference coordination operations for aerial vehicle UE.

In some embodiments, the device 300 may include application circuitry 302, baseband circuitry 304, Radio Frequency (RF) circuitry 306, front-end module (FEM) circuitry 308, one or more antennas 310, and power management circuitry (PMC) 312 coupled together at least as shown. The components of the illustrated device 300 may be included in a UE (e.g., UE 101, UE 102, UE 260, UE 708) or a RAN node (e.g., Macro RAN node 111, LP RAN node 112, gNB 280). In some embodiments, the device 300 may include less elements (e.g., a RAN node may not utilize application circuitry 302, and instead may include a processor/controller to process IP data received from an EPC). In some embodiments, the device 300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 300. In some embodiments, processors of application circuitry 302 may process IP data packets received from an EPC.

The baseband circuitry 304 may include circuitry such as, but not limited to, one or more single-core or multi-core processors. The baseband circuitry 304 may include one or more baseband processors or control logic to process baseband signals received from a receive signal path of the RF circuitry 306 and to generate baseband signals for a transmit signal path of the RF circuitry 306. Baseband processing circuitry 304 may interface with the application circuitry 302 for generation and processing of the baseband signals and for controlling operations of the RF circuitry 306. For example, in some embodiments, the baseband circuitry 304 may include a third generation (3G) baseband processor 304A, a fourth generation (4G) baseband processor 304B, a fifth generation (5G) baseband processor 304C, or other baseband processor(s) 304D for other existing generations, generations in development or to be developed in the future (e.g., second generation (2G), sixth generation (6G), etc.). The baseband circuitry 304 (e.g., one or more of baseband processors 304A-D) may handle various radio control functions that enable communication with one or more radio networks via the RF circuitry 306.

In other embodiments, some or all of the functionality of baseband processors 304A-D may be included in modules stored in the memory 304G and executed via a Central Processing Unit (CPU) 304E. The radio control functions may include, but are not limited to, signal modulation/demodulation, encoding/decoding, radio frequency shifting, etc. In some embodiments, modulation/demodulation circuitry of the baseband circuitry 304 may include Fast-Fourier Transform (FFT), precoding, or constellation mapping/demapping functionality. In some embodiments, encoding/decoding circuitry of the baseband circuitry 304 may include convolution, tail-biting convolution, turbo, Viterbi, or Low Density Parity Check (LDPC) encoderdecoder/decoder functionality. Embodiments of modulation/demodulation and encoder/decoder functionality are not limited to these examples and may include other suitable functionality in other embodiments.

In some embodiments, the baseband circuitry 304 may include one or more audio digital signal processor(s) (DSP) 304F. The audio DSP(s) 304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc. to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the receive signal path of the RF circuitry 306 may include mixer circuitry 306A, amplifier circuitry 306B and filter circuitry 306C. In some embodiments, the transmit signal path of the RF circuitry 306 may include filter circuitry 306C and mixer circuitry 306A. RF circuitry 306 may also include synthesizer circuitry 306D for synthesizing a frequency for use by the mixer circuitry 306A of the receive signal path and the transmit signal path. In some embodiments, the mixer circuitry 306A of the receive signal path may be configured to down-convert RF signals received from the FEM circuitry 308 based on the synthesized frequency provided by synthesizer circuitry 306D. The amplifier circuitry 306B may be configured to amplify the down-converted signals and the filter circuitry 306C may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306A of the receive signal path may comprise passive mixers, although the scope of the embodiments is not limited in this respect.

In some embodiments, the mixer circuitry 306A of the transmit signal path may be configured to up-convert input baseband signals based on the synthesized frequency provided by the synthesizer circuitry 306D to generate RF output signals for the FEM circuitry 308. The baseband signals may be provided by the baseband circuitry 304 and may be filtered by filter circuitry 306C.

In some embodiments, the mixer circuitry 306A of the receive signal path and the mixer circuitry 306A of the transmit signal path may include two or more mixers and may be arranged for quadrature downconversion and upconversion, respectively. In some embodiments, the mixer circuitry 306A of the receive signal path and the mixer circuitry 306A of the transmit signal path may include two or more mixers and may be arranged for image rejection (e.g., Hartley image rejection). In some embodiments, the mixer circuitry 306A of the receive signal path and the mixer circuitry 306A may be arranged for direct downconversion and direct upconversion, respectively. In some embodiments, the mixer circuitry 306A of the receive signal path and the mixer circuitry 306A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RE circuitry 306.

In some dual-mode embodiments, a separate radio IC circuitry may be provided for processing signals for each spectrum, although the scope of the embodiments is not limited in this respect.

In some embodiments, the synthesizer circuitry 306D may be a fractional-N synthesizer or a fractional N/N+1 synthesizer, although the scope of the embodiments is not limited in this respect as other types of frequency synthesizers may be suitable. For example, synthesizer circuitry 306D may be a delta-sigma synthesizer, a frequency multiplier, or a synthesizer comprising a phase-locked loop with a frequency divider.

The synthesizer circuitry 306D may be configured to synthesize an output frequency for use by the mixer circuitry 306A of the RF circuitry 306 based on a frequency input and a divider control input. In some embodiments, the synthesizer circuitry 306D may be a fractional N/N+1 synthesizer.

In some embodiments, frequency input may be provided by a voltage controlled oscillator (VCO), although that is not a requirement. Divider control input may be provided by either the baseband circuitry 304 or the applications processor 302 depending on the desired output frequency. In some embodiments, a divider control input (e.g., N) may be determined from a look-up table based on a channel indicated by the applications processor 302.

Synthesizer circuitry 306D of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLo). In some embodiments, the RF circuitry 306 may include an IQ/polar converter.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310. In various embodiments, the amplification through the transmit or receive signal paths may be done solely in the RF circuitry 306, solely in the FEM 308, or in both the RF circuitry 306 and the FEM 308.

In some embodiments, the FEM circuitry 308 may include a TXiRX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310).

In some embodiments, the PMC 312 may manage power provided to the baseband circuitry 304. In particular, the PMC 312 may control power-source selection, voltage scaling, battery charging, or DC-to-DC conversion. The PMC 312 may often be included when the device 300 is capable of being powered by a battery, for example, when the device is included in a LUE. The PMC 312 may increase the power conversion efficiency while providing desirable implementation size and heat dissipation characteristics.

While FIG. 3 shows the PMC 312 coupled only with the baseband circuitry 304. However, in other embodiments, the PMC 312 may be additionally or alternatively coupled with, and perform similar power management operations for, other components such as, but not limited to, application circuitry 302, RF circuitry 306, or FEM 308.

In some embodiments, the PMC 312 may control, or otherwise be part of, various power saving mechanisms of the device 300. For example, if the device 300 is in an RRC_Connected state, where it is still connected to the RAN node as it expects to receive traffic shortly, then it may enter a state known as Discontinuous Reception Mode (DRX) after a period of inactivity. During this state, the device 300 may power down for brief intervals of time and thus save power.

If there is no data traffic activity for an extended period of time, then the device 300 may transition off to an RRC_Idle state, where it disconnects from the network and does not perform operations such as channel quality feedback, handover, etc. The device 300 goes into a very low power state and it performs paging where again it periodically wakes up to listen to the network and then powers down again. The device 300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 302 and processors of the baseband circuitry 304 may be used to execute elements of one or more instances of a protocol stack (e.g., protocol stack described with respect to FIGS. 2A and 2B). For example, processors of the baseband circuitry 304, alone or in combination, may be used execute Layer 3, Layer 2, or Layer 1 functionality, while processors of the application circuitry 304 may utilize data (e.g., packet data) received from these layers and further execute Layer 4 functionality (e.g., transmission communication protocol (TCP) and user datagram protocol (UDP) layers). As referred to herein, Layer 3 may comprise a RRC layer (e.g., 255, 264, 282). As referred to herein, Layer 2 may comprise a MAC layer (e.g., 220, 270, 288), a RLC layer (e.g., 230, 268, 286), and a PDCP layer (e.g., 240, 266, 284). As referred to herein, Layer 1 may comprise a PHY layer (e.g., 210, 272, 290) of a UERAN node.

Figure 4:
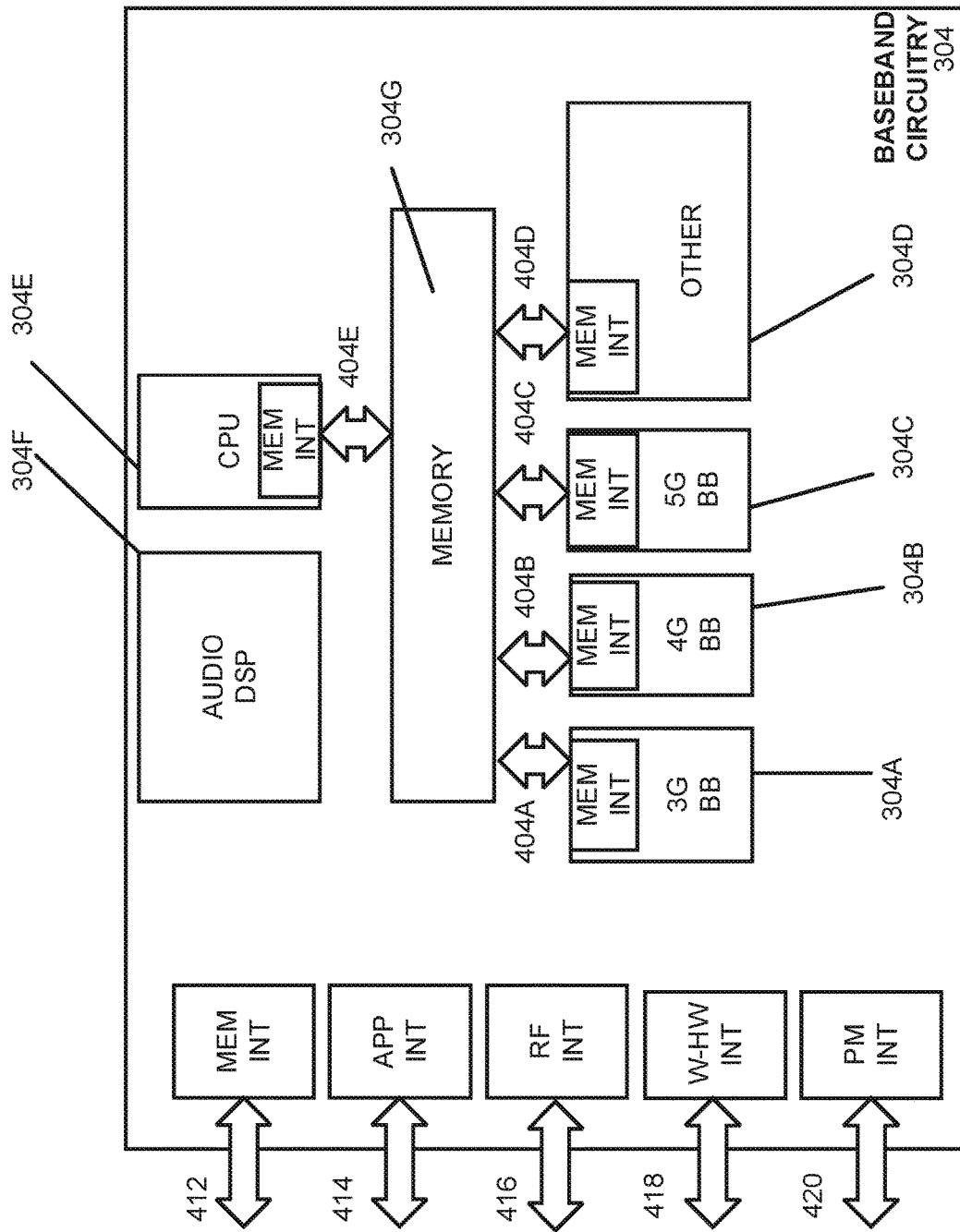
FIG. 4 illustrates example interfaces of baseband circuitry in accordance with some embodiments.

FIG. 4 illustrates example interfaces of baseband circuitry in accordance with some embodiments. As discussed above, the baseband circuitry 304 of FIG. 3 may comprise processors 304A-304E and a memory 304G utilized by said processors. Each of the processors 304A-304E may include a memory interface, 404A-404E, respectively, to send/receive data to/from the memory 304G.

The baseband circuitry 304 may further include one or more interfaces to communicatively couple to other circuitries/devices, such as a memory interface 412 (e.g., an interface to send/receive data to/from memory external to the baseband circuitry 304), an application circuitry interface 414 (e.g., an interface to send/receive data to/from the application circuitry 302 of FIG. 3), an RF circuitry interface 416 (e.g., an interface to send/receive data to/from RF circuitry 306 of FIG. 3), a wireless hardware connectivity interface 418 (e.g., an interface to send/receive data to/from Near Field Communication (NFC) components, Bluetooth® components (e.g., Bluetooth® Low Energy), Wi-Fi® components, and other communication components), and a power management interface 420 (e.g., an interface to send/receive power or control signals to/from the PMC 312).

Figure 5:
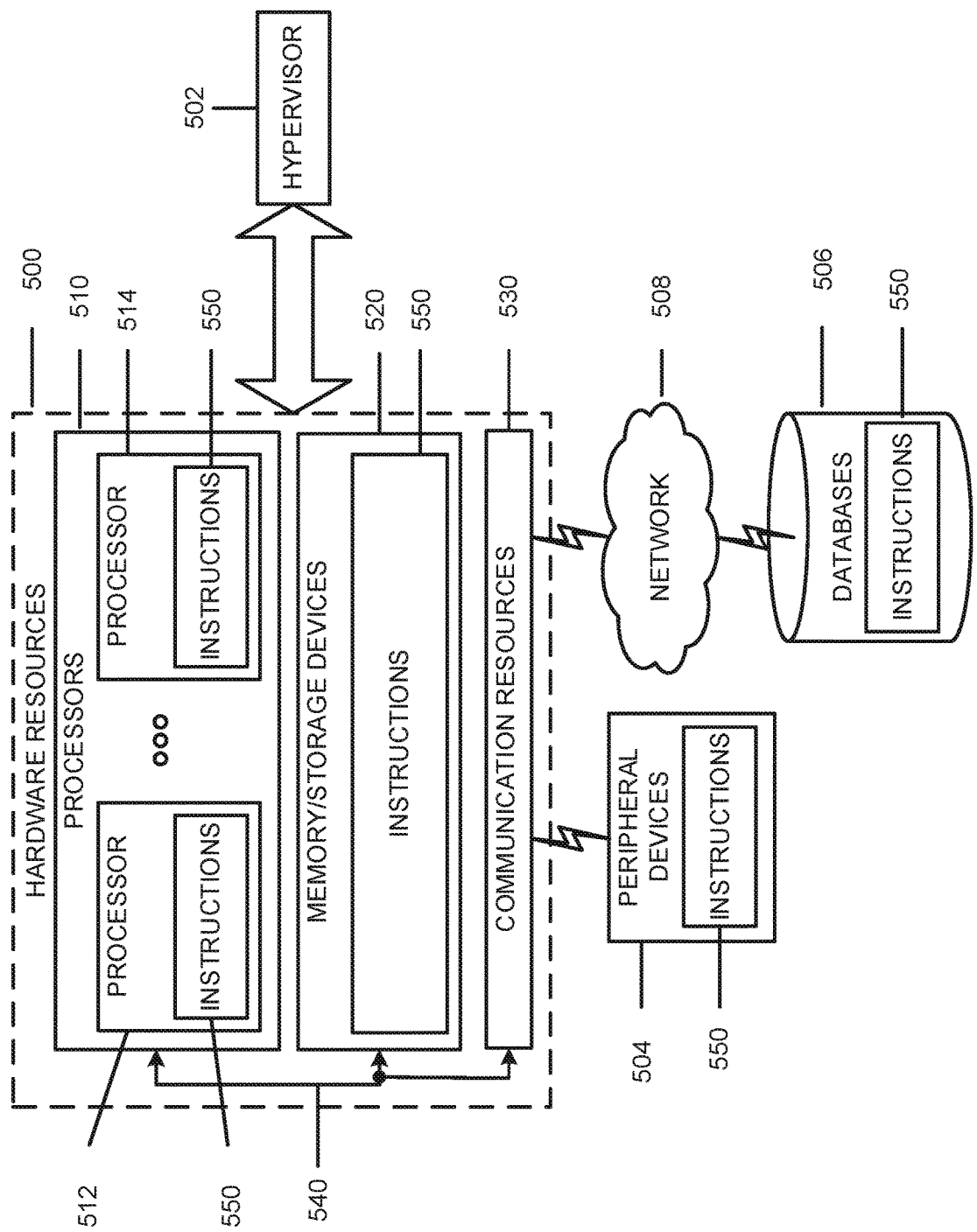
FIG. 5 is a block diagram illustrating components, according to some example embodiments, able to read instructions from a machine-readable or computer-readable medium.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein, for example, one or more interference coordination operations for aerial vehicle UEs. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540. For embodiments where node virtualization (e.g., NFV) is utilized, a hypervisor 502 may be executed to provide an execution environment for one or more network slices/sub-slices to utilize the hardware resources 500.

The processors 510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 512 and a processor 514.

The memory/storage devices 520 may include main memory, disk storage, or any suitable combination thereof. The memory/storage devices 520 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 530 may include interconnection or network interface components or other suitable devices to communicate with one or more peripheral devices 504 or one or more databases 506 via a network 508. For example, the communication resources 530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

Interference Coordination

Figure 6:
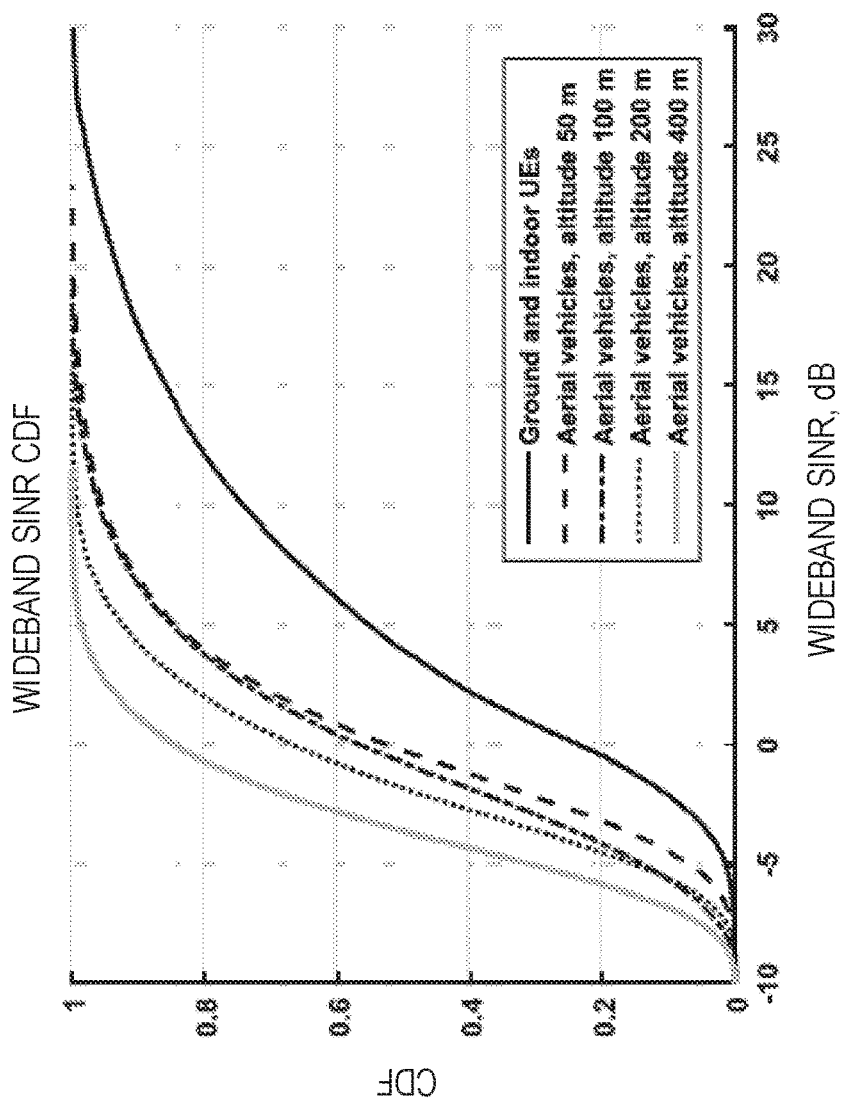
FIG. 6 illustrates an exemplary wideband signal-to-interference-plus-noise ratio (SINR) cumulative distribution function (CDF) for various user equipment, in accordance with some embodiments.

FIG. 6 illustrates an exemplary wideband signal-to-interference-plus-noise ratio (SINR) cumulative distribution function (CDF) for various UE, including grounded (e.g., indoor) UE and aerial vehicle UE or aerial vehicles, such as drones. FIG. 6 illustrates how various aerial vehicles at different altitudes may experience negative values of wideband SINR (e.g., more than 50% of aerial vehicles at 100 m).

Figure 7:
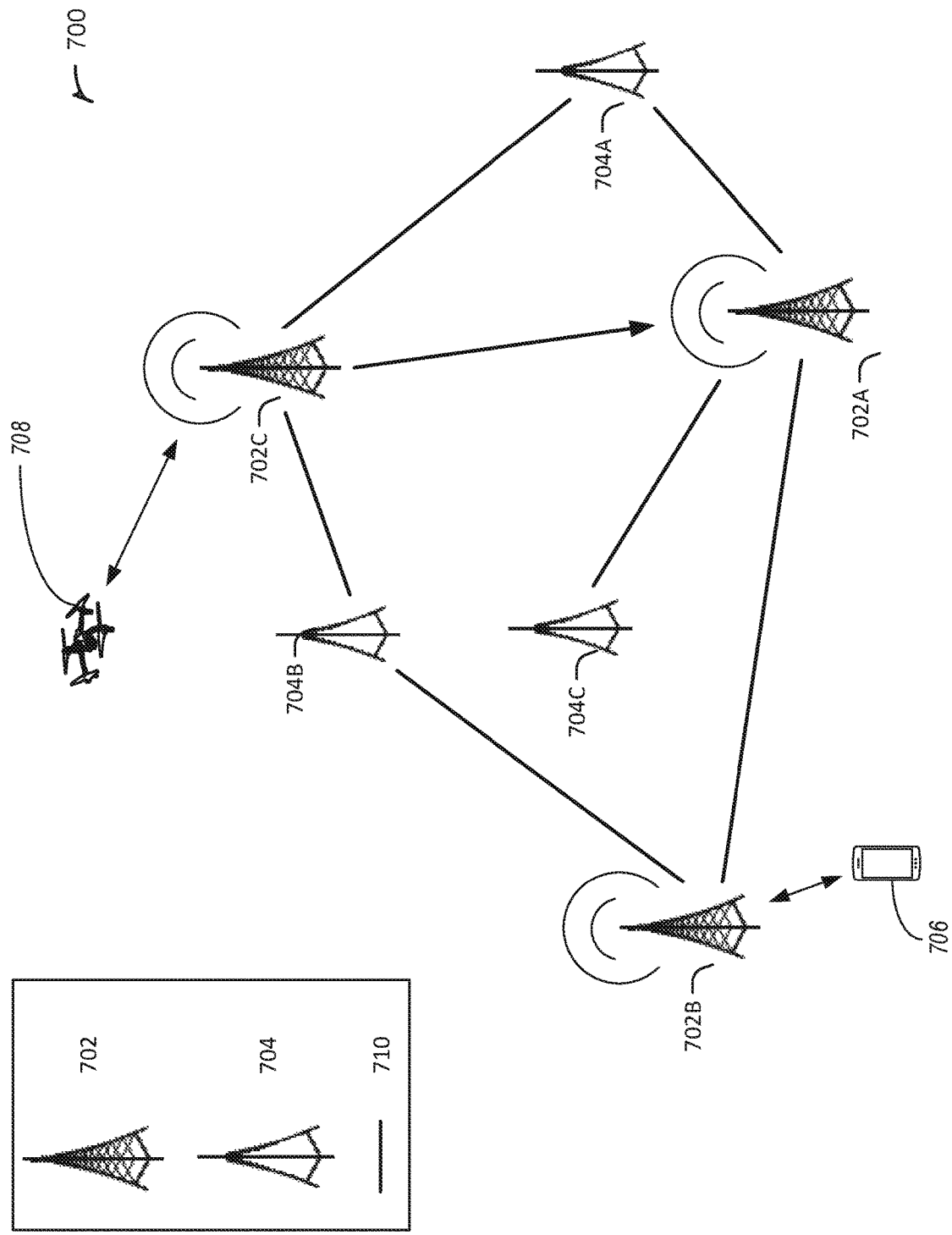
FIG. 7 illustrates an exemplary network configured for interference coordination operations for aerial vehicles, in accordance with some embodiments.

In some embodiments, a network may use interference coordination techniques and operations to improve interference conditions for aerial vehicles. FIG. 7 illustrates an exemplary network 700 configured for interference coordination operations in accordance with some embodiments. In some embodiments, the network 700 can include a plurality of network nodes and LEs. In certain embodiments, the network 700 can include other network elements not shown in FIG. 7, for example, any one of the network elements illustrated in FIG. 1.

In some embodiments, the network 700 can include network nodes (e.g., base station, eNB, gNB) 702A-702C and 704A-704C and UEs 706 and 708. Some UEs (e.g., 708) may be aerial vehicle UEs (e.g., drones) that fly at various altitudes above the network 700, while other UEs (e.g., 706) maybe LEs that operate closer in altitude to the network 700 (e.g., terrestrial U¹E). In some embodiments, network 700 may include elements (e.g., base stations 702A-702C and 704A-704C, and UEs 706 and 708) that are similar to, or the same as, network elements described with respect to FIGS. 1-5 and 9 (e.g., UE 101, 102, UE 708, nodes 111, 112).

In some embodiments, a base station (e.g., base station 702B) that is serving a UE (e.g., UE 706) will have a signal power that is stronger in comparison to other neighboring base stations (e.g., 702A, 702C, 704A-704C) because the base station 702B is closer in proximity to the UE 706. For example, base station 702B may transmit signaling to the UE 706 that has better SINR than neighboring base stations. For UEs (e.g., UE 706) that operate closer in altitude to the network 700 (e.g., UE 700), interference may be less of a problem in comparison to aerial vehicle UEs (e.g., UE 708). In the case of UE 706, for example, because neighboring base stations (e.g., 702A, 702C, 704A-704C) are positioned at a sufficient distance from the serving base station (e.g., base station 706B), interfering signaling from the neighboring base stations will have low enough power to avoid degrading the SINR of the serving base station 702B.

However, because an aerial vehicle UE (e.g., aerial vehicle UE 708) may be flying at an altitude at which distances between the aerial vehicle UE 708 and several base stations (e.g., 702A-702C, 704A-704C) may be equal, interfering signaling from neighboring base stations can be problematic. For example, if base station 702C is serving the aerial vehicle UE 708 and if similar distances exist between the aerial vehicle 708 and base stations 704B and 704C, the interfering signaling from base stations 704B and 704C may be strong enough to interfere with signaling and degrade the SINR of the serving base station 702C. This is especially true given a line-of-sight communication link in free-space.

In some embodiments, the interference coordination operation described herein alleviates such intfeference from neighboring base stations. For example, in certain embodiments a set of base stations 702 may be designated to serve aerial vehicle UEs (e.g., any one or more of base stations 702A-702C), while another set 704 of base stations (e.g., any one or more of base stations 704A-704C) may be designated to refrain from serving the aerial vehicle UEs or may be configured to reduce transmission activities related to the aerial vehicle UEs. In some embodiments, two or more base stations may communicate signaling (e.g., over an X2 interface 710), for example, signaling to indicate that a base station is to serve and/or refrain from serving an aerial vehicle UE. In certain embodiments, such signaling may include an indication of certain time-frequency resources to be used by one or more base stations (e.g., any of base stations 702A-702C) for serving the aerial vehicle UE 708, as further described below. In some embodiments, the set of base stations 702 that is designated to serve aerial vehicle UEs (e.g., base stations 702A-702C) may be configured by processing circuitry (e.g., baseband circuitry) at a base station to transmit and receive signaling (e.g., using transceiver circuitry and one or more antennas) in a subset of time-frequency resources (e.g., dedicated time-frequency resources).

Figure 8:
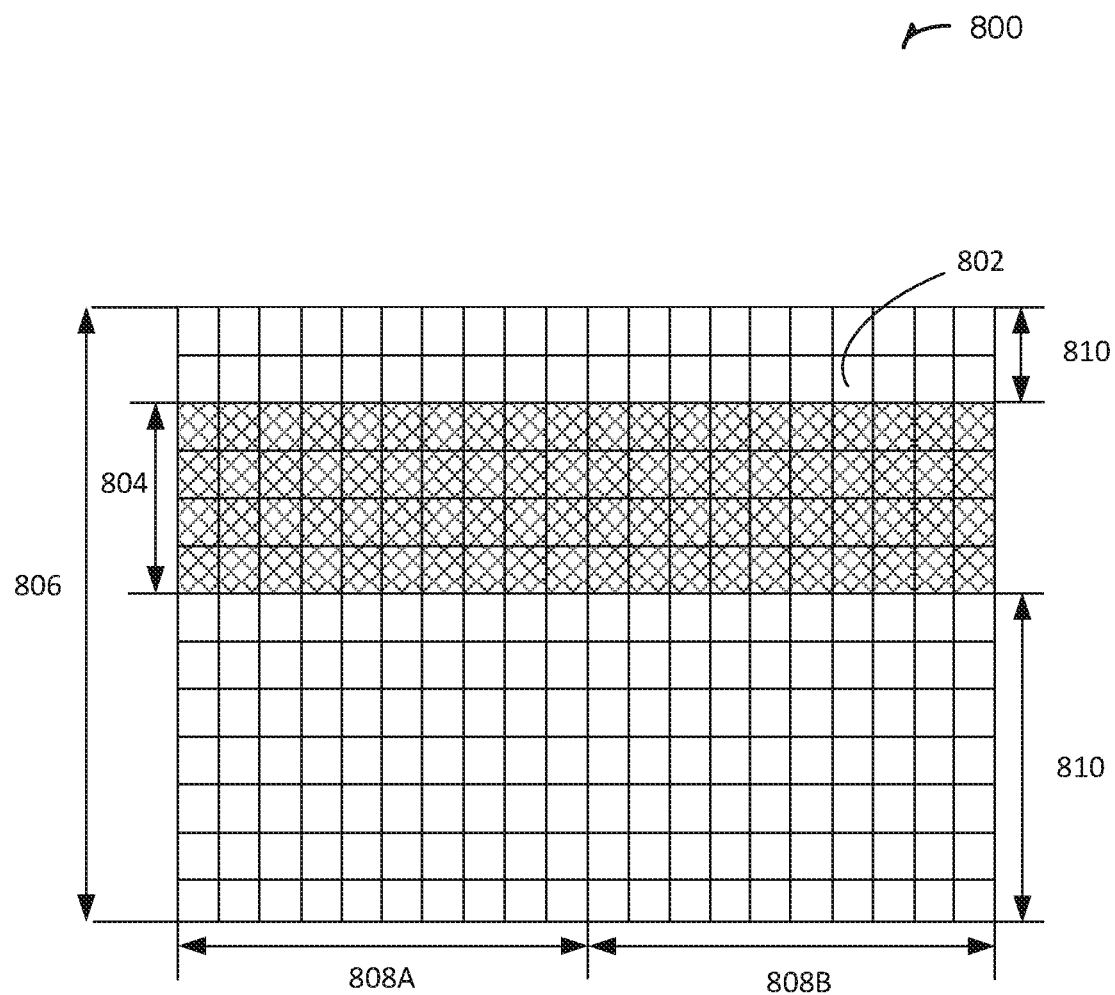
FIG. 8 illustrates exemplary time-frequency resources, in accordance with some embodiments.

FIG. 8 illustrates exemplary time-frequency resources 800 in accordance with some embodiments. The time-frequency resources 800 may be represented as a resource grid comprising a number of physical resource blocks (PRBs) 802, for example, where each resource block 802 comprises a number of subcarriers (e.g., in the y-axis) and a number of slots (e.g., symbols in the x-axis). In some embodiments, a subset of time-frequency resources 804 comprises a portion of a system bandwidth 806 of the time-frequency resources 800. The subset of time-frequency resources 804, in certain embodiments, may be a subset of subframes 808A and 808B of a radio frame, for example a LTE radio frame and/or a 5G radio frame. In certain embodiments, the network 700 (e.g., a base station) may assign a location of the subset of time-frequency resources 804 within the system bandwidth 806 of the time-frequency resources 800, semi-statically or dynamically. In certain embodiments, a base station that is to serve an aerial vehicle UE, or refrain from serving an aerial vehicle UE, may be preconfigured accordingly and/or may use stored information and algorithms for determining whether to serve an aerial vehicle UE.

The subset of time-frequency resources 804 may comprise, for example, a contiguous set of PRBs 802 within the system bandwidth 806, and may include a set of frequency locations within the time-frequency spectrum. One or more base stations (e.g., serving base station 702C) may use the subset of time-frequency resources (e.g., 804) to serve one or more aerial vehicle UEs (e.g., aerial vehicle UE 708), which may include receiving signaling and/or transmitting signaling on the subset of time-frequency resources (e.g., 804) in one or more channels. Such channels may include, for example, a physical broadcast channel (PBCH), a physical downlink control channel (PDCCH), a physical downlink shared channel (PDSCH), a physical uplink control channel (PUCCH), and a physical uplink shared channel (PUSCH). In some embodiments, base stations that are not designated to serve aerial vehicle UEs may use the remaining time-frequency resources (e.g., 810) for transmitting and/or receiving signaling (e.g., to non-aerial vehicle UEs), although embodiments, are not so limited.

In some embodiments, one or more base stations (e.g., any of base stations 704A-704C) that neighbor the serving base station 702C may refrain from using the subset of time-frequency resources 804 or may modify signaling. In one embodiment, a base station (e.g., base station not designated to serve an aerial vehicle UE 708) can modify signaling by reducing a power level for signaling transmitted in the subset of time-frequency resources 804. A base station may use one or more other methods to modify signaling, as described further below. In some embodiments, the network may have knowledge of a type of a UE (e.g., UE 702B or UE 708), for example, the network may assume that a UE is an aerial vehicle UE 708. In certain embodiments, base stations (e.g., 702A-702C and/or 704A-704C) may exchange information regarding a location of dedicated time-frequency resources (e.g., 804) for transmissions to and/or from one or more aerial vehicle UEs (e.g., 708).

In some embodiments, a UE 708 (e.g., processing circuitry or baseband circuitry of UE 708) encodes signaling, for transmission to a base station (e.g., via one or more antennas of the UE 708 to base station 702C), that includes information pertaining to the UE 708, such as an indication of whether the UE 708 is an aerial vehicle UE. The signaling, in some embodiments, may be higher layer signaling (e.g., RRC, NAS). In other embodiments, the network (e.g., base station 702C) can detect whether a UE is an aerial vehicle UE. For example, the base station 702C may detect such information by decoding uplink reference signaling received from the aerial vehicle LIE 708. Uplink reference signaling may include, for example, uplink reference signals transmitted from the LE 708 to the base station (e.g., Sounding Reference Signal (SRS), demodulation reference signal (DM-RS)).

In some embodiments, a base station (e.g., base station 702C) can select a subset of time-frequency resources (e.g., 804) for use in serving the aerial vehicle UE 708 based on the received uplink reference signaling. The base station may select the subset of time-frequency resources for serving the aerial vehicle UE so as to avoid or reduce interference from neighboring base stations. In certain embodiments, multiple base stations can receive and decode signaling from a UE to determine whether the UJE is an aerial vehicle UE, for example, if multiple base stations detect uplink reference signals from a single UE that are similar in value, the base stations may determine that the UE is an aerial vehicle UE (e.g., because of the characteristics of a line-of-sight communication link), as opposed to a UE on the ground that is closer to a single base station.

In certain embodiments, a set of multiple base stations may be designated to serve the aerial vehicle UE (e.g., 708), for instance, using a joint transmission configuration. In other embodiments, a single base station may be designated to serve the aerial vehicle UE (e.g., 708) and one or more additional aerial vehicle UEs. The network 700 (e.g., base station) may determine, for example, a set of base stations configured to serve an aerial vehicle LE based on signaling exchanges between base stations (e.g., over the X2 interface). In some embodiments, the base station (e.g., 702C) can indicate to a UE (e.g., aerial vehicle UE 708), through signaling, a specific set of cell identifiers (IDs) that are serving aerial vehicles.

For example, the base station may transmit a specific set of cell IDs to the aerial vehicle UE (e.g., 708) using control signaling (e.g., RRC signaling). The aerial vehicle UE (e.g., 708) may report, via signaling transmitted to the base station (e.g., 702C), radio resource management (RRM) measurements for the set of the cell IDs. A RRM measurement may include a measurement of Reference Signal Received Power (RSRP), Reference Signal Received Quality (RSRQ), Received Signal Strength Indicator (RSSI), or Channel Quality Indicator (CQI), in some embodiments, and such measurements may be associated with signaling from a base station (e.g., neighboring base station) that is designated in the set of cell IDs received by the UE (e.g., 708) from the base station (e.g., 702C).

In certain embodiments, if a RRM measurement of at least one of the cell IDs (e.g., base station associated with one of the cell IDs) is above minimum threshold, the base station 702C may transmit, to the aerial vehicle UE 708, a handover command for a cell (e.g., base station) corresponding to that cell ID (e.g., 702A). In other embodiments, if the RRM measurements for all cell IDs are below the threshold, the base station 702C may make a determination to serve, or continue to serve, the aerial vehicle UE 708. Accordingly, in some embodiments, the base station 702C may then inform one or more other base stations (e.g., neighboring base stations), for example, over the X2 interface using X2 signaling, that the base station 702C will serve the aerial vehicle UE 708 using a specific subset of time-frequency resources (e.g., 804). In other embodiments, the base station 702C and one or more neighboring base stations (e.g., 702A) may serve the aerial vehicle UE 708 (e.g., in a joint transmission) using the same subset of time-frequency resources (e.g., 804).

In some embodiments, base stations that are not assigned to serve aerial vehicle UEs (e.g., base station 702C if it transmits the handover command based on the RRM measurements) may be restricted from transmission and/or reception in the subset of time-frequency resources 804. In certain embodiments, the base station 702C may reduce an amount of information to be encoded in a subframe for transmission in the subset of time-frequency resources 804. For example, the base station 702C may encode and transmit almost blank subframes to decrease activity in the subset of time-frequency resources 804 to avoid interference with the serving base station(s). An almost blank subframe, in some embodiments, can be a subframe in which a channel (e.g., PDCCH, PDSCH) is not transmitted and/or is transmitted with reduced power and/or loading.

In some embodiments, in transmitting signaling to indicate information regarding the location of dedicated time-frequency resources (e.g., 804) to be used for serving an aerial vehicle UE 708, the base station (e.g., 702C) may encode a bitmap for transmission to another base station (e.g., neighbor base station 702A). The bitmap can indicate the dedicated time-frequency resources 804 for use by the base station 702C. In other embodiments, information may be represented as a bitmap to indicate time-frequency resources in which the base station will not serve aerial vehicle UEs, and in which the base station may decrease transmitting and/or receiving signaling. In some embodiments, base stations may exchange such signaling over the X2 interface.

Figure 9:
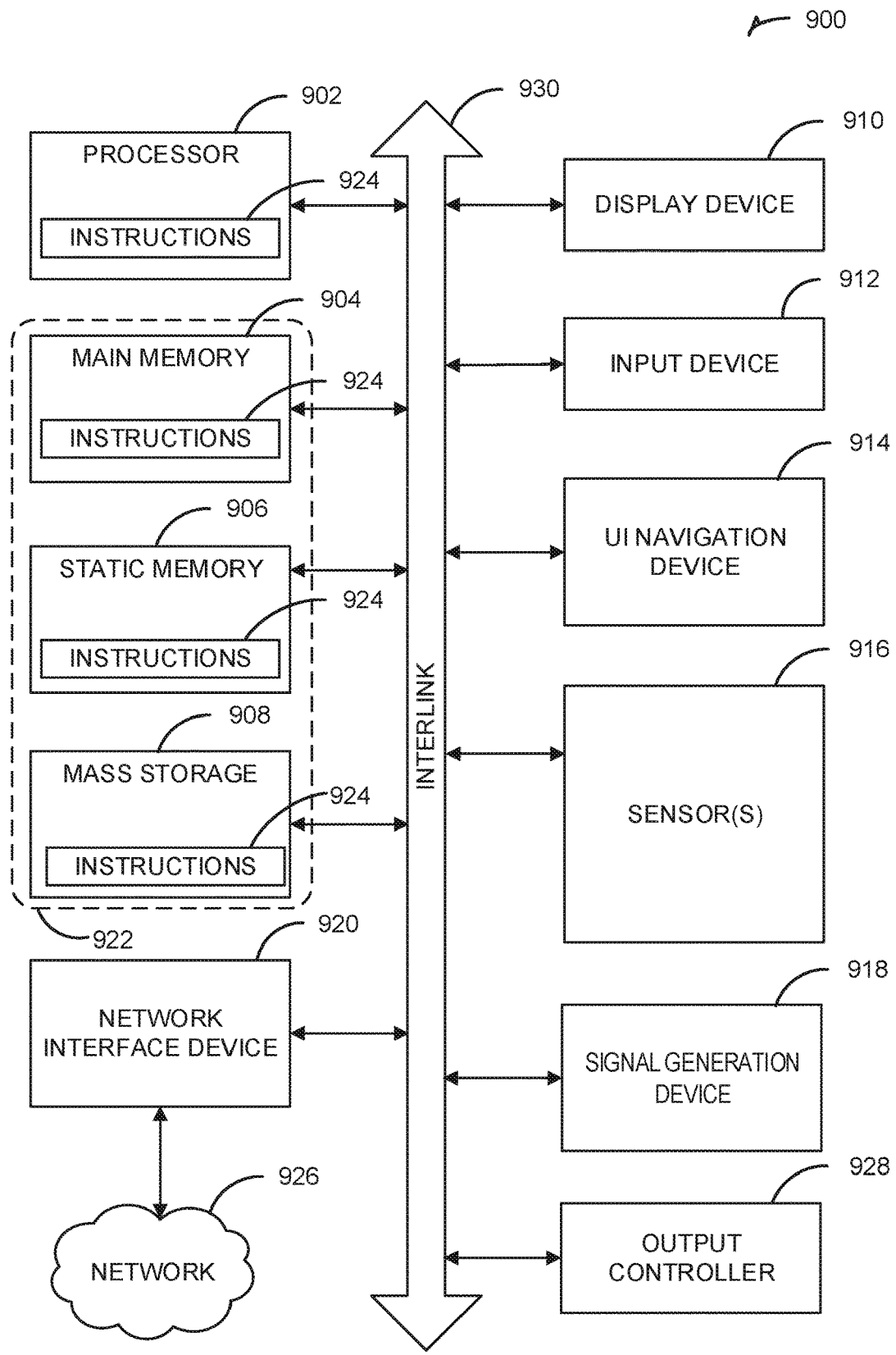
FIG. 9 illustrates a block diagram of an example machine, in accordance with some embodiments.

FIG. 9 illustrates a block diagram of an example machine 900 upon which any one or more of the techniques (e.g., methodologies) discussed herein may be performed, for example, one or more interference coordination operations for aerial vehicles. For example, the machine 900 may be or may be part of a device as described above (e.g., UE 101, UE 102, UE 260, UE 708, RAN Node 111/112).

Examples, as described herein, may include, or may operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 may include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drive, tape drive, flash storage, or other block devices) some or all of which may communicate with each other via an interlink (e.g., bus) 930. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 may be, or include, a machine readable medium 922 on which is stored one or more sets of data structures or instructions 924 (e.g., software) embodying or utilized by any one or more of the techniques or fnctions described herein. The instructions 924 may also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 may constitute the machine readable media 922. While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

EXAMPLES

Although an aspect has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "aspect" merely for convenience and without intending to voluntarily limit the scope of this application to any single aspect or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect. The following describes various examples of methods, machine-readable media, and systems (e.g., machines, devices, or other apparatus) discussed herein.

Example 1 is an apparatus of a Base Station (BS) comprising: memory; and processing circuitry configured to: select a first subset of time-frequency resources, the first subset of time-frequency resources dedicated for use in serving aerial vehicle user equipment (UE) by the BS, wherein the BS is configured to communicate with the aerial vehicle UEs via the first subset of time-frequency resources; encode, for transmission to one or more neighbor BSs, signaling indicating that the BS has dedicated the first subset of time-frequency resources for serving aerial vehicle UEs, the signaling to indicate to the one or more neighbor BSs the first subset of time-frequency resources; decode, from signaling received from the one or more neighbor BSs, an indication that at least one neighbor BS is to dedicate a second subset of time-frequency resources to serve aerial vehicle UEs; and based on the indication, reduce transmission activities in the second subset of time-frequency resources, and wherein the memory is configured to store the indication.

In Example 2, the subject matter of Example 1 includes, wherein the processing circuitry is configured to reduce transmission activities by reducing an amount of information to be encoded in a subframe for transmission in the second subset of time-frequency resources.

In Example 3, the subject matter of Example 2 includes, wherein the subframe is an almost blank subframe.

In Example 4, the subject matter of Examples 1-3 includes, wherein the processing circuitry is configured to reduce transmission activities by transmitting one or more of a physical downlink control channel (PDCCH) or a physical downlink shared channel (PDSCH) with a reduced transmission power level.

In Example 5, the subject matter of Examples 1-4 includes, wherein the processing circuitry is configured to reduce transmission activities by refraining from transmitting one of the PDCCH or the PDSCH.

In Example 6, the subject matter of Examples 1-5 includes, wherein the first subset of time-frequency resources and the second subset of time-frequency resources are the same subset of time-frequency resources.

In Example 7, the subject matter of Examples 1-6 includes, wherein the processing circuitry is configured to select the subset of time-frequency resources semi-statically or dynamically.

In Example 8, the subject matter of Examples 1-7 includes, interface.

In Example 9, the subject matter of Examples 1-8 includes, wherein the first subset of time-frequency resources includes a subset of subframes.

In Example 10, the subject matter of Examples 1-9 includes, wherein the processing circuitry is configured to encode, for transmission to the one or more neighbor BSs, signaling including a bitmap to identify time-frequency resources, including the first subset of time-frequency resources.

In Example 11, the subject matter of Examples 1-10 includes, wherein the processing circuitry is configured to: decode, from signaling received from a UE, an indication that the UE is an aerial vehicle UE; and select the first subset of time-frequency resources for use in serving the UE.

In Example 12, the subject matter of Example 11 includes, wherein the signaling received from the UE is radio resource control (RRC) signaling.

In Example 13, the subject matter of Examples 11-12 includes, wherein the processing circuitry is configured to decode uplink reference signaling from the UE; and in response to determining, from the uplink reference signaling, that the UE is an aerial vehicle UE, select the first subset of time-frequency resources to use in serving the UE and to reduce interference with the one or more neighbor BSs while serving the UE.

In Example 14, the subject matter of Examples 11-13 includes, wherein the processing circuitry is configured to: encode, for transmission to the UE, signaling including a set of cell identifiers (IDs) that correspond to the one or more neighbor BSs; decode, from signaling received from the UE, radio resource management (RRIM) measurements corresponding to the set of cell IDs; compare the RRM measurements to a threshold value; and encode, for transmission to the UE, a handover command to a BS indicated in the set of cell IDs for which associated RRM measurements exceed the threshold value.

In Example 15, the subject matter of Example 14 includes, wherein the processing circuitry is configured to refrain from encoding the handover command for transmission to the LE when the RRM measurements are below the threshold value.

In Example 16, the subject matter of Examples 1-15 includes, wherein the processing circuitry is a baseband processor.

In Example 17, the subject matter of Examples 1-16 includes, wherein the apparatus further comprises two or more antennas and a transceiver, the two or more antennas and the transceiver configured to transmit the signaling, to the one or more other BSs, indicating that the BS is to serve aerial vehicles using the first subset of time-frequency resources.

Example 18 is a computer-readable hardware storage device that stores instructions for execution by one or more processors of a Base Station (BS), the instructions to configure the one or more processors to: select a first subset of time-frequency resources, the first subset of time-frequency resources dedicated for use in serving aerial vehicle user equipment (UE) by the BS, wherein the BS is configured to communicate with the aerial vehicle UEs via the first subset of time-frequency resources; encode, for transmission to one or more neighbor BSs, signaling indicating that the BS has dedicated the first subset of time-frequency resources for serving aerial vehicle UEs, the signaling to indicate to the one or more neighbor BSs the first subset of time-frequency resources; decode, from signaling received from the one or more neighbor BSs, an indication that at least one neighbor BS is to dedicate a second subset of time-frequency resources to serve aerial vehicle UEs; and based on the indication, reduce transmission activities in the second subset of time-frequency resources.

In Example 19, the subject matter of Example 18 includes, wherein the instructions are to configure the one or more processors to reduce transmission activities by reducing an amount of information to be encoded in a subframe for transmission in the second subset of time-frequency resources.

In Example 20, the subject matter of Examples 18-19 includes, wherein the instructions are to configure the one or more processors to reduce transmission activities by transmitting one or more of a physical downlink control channel (PDCCH) or a physical downlink shared channel (PDSCH) with a reduced transmission power level or refraining from transmitting one of the PDCCH or the PDSCH.

Example 21 is an apparatus of a Base Station (BS) comprising: means to select a first subset of time-frequency resources, the first subset of time-frequency resources dedicated for use in serving aerial vehicle user equipment (UE) by the BS, wherein the BS is configured to communicate with the aerial vehicle UEs via the first subset of time-frequency resources; means to encode, for transmission to one or more neighbor BSs, signaling indicating that the BS has dedicated the first subset of time-frequency resources for serving aerial vehicle UEs, the signaling to indicate to the one or more neighbor BSs the first subset of time-frequency resources; means to decode, from signaling received from the one or more neighbor BSs, an indication that at least one neighbor BS is to dedicate a second subset of time-frequency resources to serve aerial vehicle UEs; means to reduce transmission activities in the second subset of time-frequency resources based on the indication; and means to store the indication.

In Example 22, the subject matter of Example 21 includes, means to reduce transmission activities by reducing an amount of information to be encoded in a subframe for transmission in the second subset of time-frequency resources.

In Example 23, the subject matter of Example 22 includes, wherein the subframe is an almost blank subframe.

In Example 24, the subject matter of Examples 21-23 includes, means to reduce transmission activities by transmitting one or more of a physical downlink control channel (PDCCH) or a physical downlink shared channel (PDSCH) with a reduced transmission power level.

In Example 25, the subject matter of Examples 21-24 includes, means to reduce transmission activities by refraining from transmitting one of the PDCCH or the PDSCH.

1 Example 26 is at least one machine-readable medium including instructions that, when executed by processing circuitry, cause the processing circuitry to perform operations to implement of any of Examples 21-25.

Example 27 is at least one machine-readable medium including instructions that, when executed by processing circuitry, cause the processing circuitry to perform operations to implement of any of Examples 1-26.

Example 28 is an apparatus comprising means to implement of any of Examples 1-26.

Example 29 is a system to implement of any of Examples 1-26.

Example 30 is a method to implement of any of Examples 1-26.

What is claimed is:

1. An apparatus, comprising:
   at least one processor configured to cause a base station (BS) to:
   select a first subset of time-frequency resources, the first subset of time-frequency resources dedicated for use in serving aerial vehicle user equipment (UE) by the BS, wherein the BS is configured to communicate with the aerial vehicle UEs via the first subset of time-frequency resources;
   encode, for transmission to one or more neighbor BSs, signaling indicating that the BS has dedicated the first subset of time-frequency resources for serving aerial vehicle UEs, the signaling to indicate to the one or more neighbor BSs the first subset of time-frequency resources;
   decode, from signaling received from the one or more neighbor BSs, an indication that at least one neighbor BS is to dedicate a second subset of time-frequency resources to serve aerial vehicle UEs; and
   based on the indication, reduce transmission activities in the second subset of time-frequency resources.

2. The apparatus of claim 1, wherein the at least one processor is further configured to cause the BS to reduce transmission activities by reducing an amount of information to be encoded in a subframe for transmission in the second subset of time-frequency resources.

3. The apparatus of claim 2, wherein the subframe is an almost blank subframe.

4. The apparatus of claim 1, wherein the at least one processor is further configured to cause the BS to reduce transmission activities by transmitting one or more of a physical downlink control channel (PDCCH) or a physical downlink shared channel (PDSCH) with a reduced transmission power level.

5. The apparatus of claim 1, wherein the at least one processor is further configured to cause the BS to reduce transmission activities by refraining from transmitting one of the PDCCH or the PDSCH.

6. The apparatus of claim 1, wherein the first subset of time-frequency resources and the second subset of time-frequency resources are the same subset of time-frequency resources.

7. The apparatus of claim 1, wherein the at least one processor is further configured to cause the BS to select the subset of time-frequency resources semi-statically or dynamically.

8. The apparatus of claim 1, wherein the at least one processor is further configured to cause the BS to configure transceiver circuitry to transmit the signaling to the one or more other BSs over an X2 interface.

9. The apparatus of claim 1, wherein the first subset of time-frequency resources includes a subset of subframes.

10. The apparatus of claim 1, wherein the at least one processor is further configured to cause the BS to encode, for transmission to the one or more neighbor BSs, signaling including a bitmap to identify time-frequency resources, including the first subset of time-frequency resources.

11. The apparatus of claim 1, wherein the at least one processor is further configured to cause the BS to:
   decode, from signaling received from a UE, an indication that the UE is an aerial vehicle UE; and
   select the first subset of time-frequency resources for use in serving the UE.

12. The apparatus of claim 11, wherein the signaling received from the UE is radio resource control (RRC) signaling.

13. The apparatus of claim 11, wherein the at least one processor is further configured to cause the BS to decode uplink reference signaling from the UE; and
   in response to determining, from the uplink reference signaling, that the UE is an aerial vehicle UE, select the first subset of time-frequency resources to use in serving the UE and to reduce interference with the one or more neighbor BSs while serving the UE.

14. The apparatus of claim 11, wherein the at least one processor is further configured to cause the BS to:
   encode, for transmission to the UE, signaling including a set of cell identifiers (IDs) that correspond to the one or more neighbor BSs;
   decode, from signaling received from the UE, radio resource management (RRM) measurements corresponding to the set of cell IDs;
   compare the RRM measurements to a threshold value; and
   encode, for transmission to the UE, a handover command to a BS indicated in the set of cell IDs for which associated RRM measurements exceed the threshold value.

15. The apparatus of claim 14, wherein the at least one processor is further configured to cause the BS to refrain from encoding the handover command for transmission to the UE when the RRM measurements are below the threshold value.

16. The apparatus of claim 1, wherein the at least one processor is a baseband processor.

17. The apparatus of claim 1, wherein the apparatus further comprises two or more antennas and a transceiver, the two or more antennas and the transceiver configured to transmit the signaling, to the one or more other BSs, indicating that the BS is to serve aerial vehicles using the first subset of time-frequency resources.

18. A non-transitory computer-readable storage medium storing program instructions executable by one or more processors to cause a Base Station (BS) to:
   select a first subset of time-frequency resources, the first subset of time-frequency resources dedicated for use in serving aerial vehicle user equipment (UE) by the BS, wherein the BS is configured to communicate with the aerial vehicle UEs via the first subset of time-frequency resources;
   encode, for transmission to one or more neighbor BSs, signaling indicating that the BS has dedicated the first subset of time-frequency resources for serving aerial vehicle UEs, the signaling to indicate to the one or more neighbor BSs the first subset of time-frequency resources;
   decode, from signaling received from the one or more neighbor BSs, an indication that at least one neighbor BS is to dedicate a second subset of time-frequency resources to serve aerial vehicle UEs; and
   based on the indication, reduce transmission activities in the second subset of time-frequency resources.

19. The non-transitory computer-readable storage medium of claim 18, wherein the program instructions are further executable to cause the BS to reduce transmission activities by reducing an amount of information to be encoded in a subframe for transmission in the second subset of time-frequency resources.

20. The non-transitory computer-readable storage medium of claim 18, wherein the program instructions are further executable to cause the BS to reduce transmission activities by transmitting one or more of a physical downlink control channel (PDCCH) or a physical downlink shared channel (PDSCH) with a reduced transmission power level or refraining from transmitting one of the PDCCH or the PDSCH.

21. A Base Station (BS), comprising:
at least one processor configured to cause the BS to:
select a first subset of time-frequency resources, the first subset of time-frequency resources dedicated for use in serving aerial vehicle user equipment (UE) by the BS, wherein the BS is configured to communicate with the aerial vehicle UEs via the first subset of time-frequency resources;
encode, for transmission to one or more neighbor BSs, signaling indicating that the BS has dedicated the first subset of time-frequency resources for serving aerial vehicle UEs, the signaling to indicate to the one or more neighbor BSs the first subset of time-frequency resources;
decode, from signaling received from the one or more neighbor BSs, an indication that at least one neighbor BS is to dedicate a second subset of time-frequency resources to serve aerial vehicle UEs;
reduce transmission activities in the second subset of time-frequency resources based on the indication.

22. The base station of claim 21, wherein the at least one processor is further configured to cause the BS to reduce transmission activities by reducing an amount of information to be encoded in a subframe for transmission in the second subset of time-frequency resources.

23. The base station of claim 22, wherein the subframe is an almost blank subframe.

24. The base station of claim 21, wherein the at least one processor is further configured to cause the BS to reduce transmission activities by transmitting one or more of a physical downlink control channel (PDCCH) or a physical downlink shared channel (PDSCH) with a reduced transmission power level.

25. The base station of claim 21, wherein the at least one processor is further configured to cause the BS to reduce transmission activities by refraining from transmitting one of the PDCCH or the PDSCH.

\* \* \* \* \*